Sept. 29, 1964   G. W. SEULEN   3,151,225
SHIELDING MEANS FOR AN ELECTROMAGNETIC ELECTRICAL CONTACTOR
Filed March 7, 1960   5 Sheets-Sheet 1

Inventor:
GERHARD W. SEULEN
BY
ATTORNEY

Sept. 29, 1964 G. W. SEULEN 3,151,225
SHIELDING MEANS FOR AN ELECTROMAGNETIC ELECTRICAL CONTACTOR
Filed March 7, 1960 5 Sheets-Sheet 3
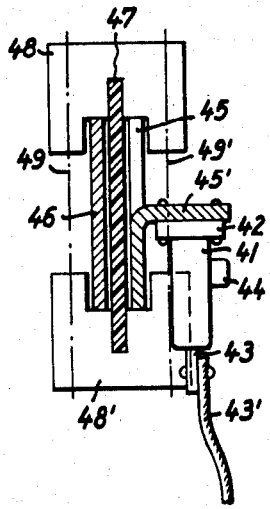
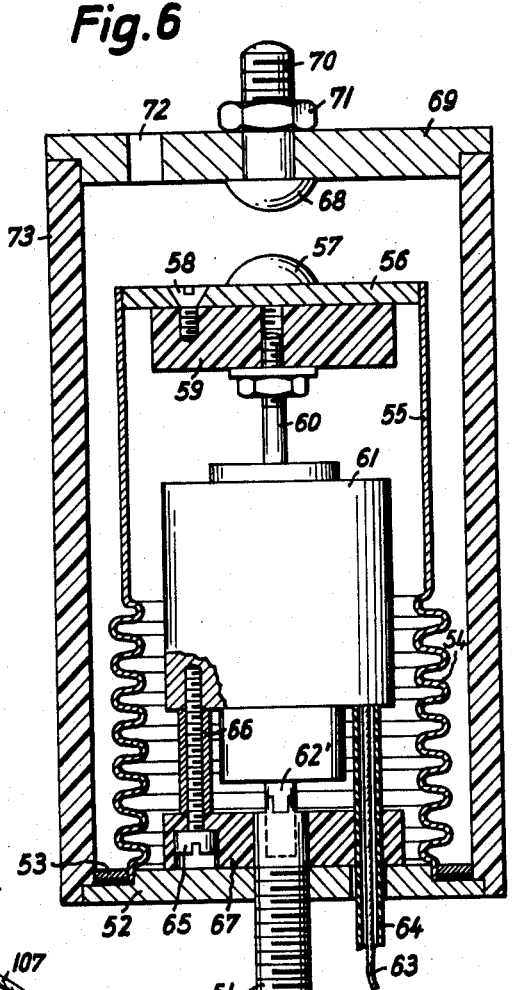
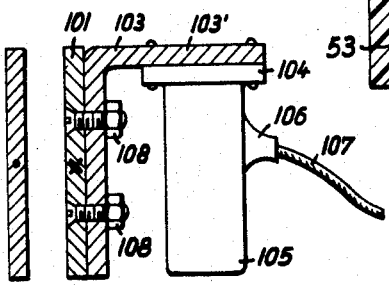
Inventor:
GERHARD W. SEULEN
BY
Alfred C. Body
ATTORNEY

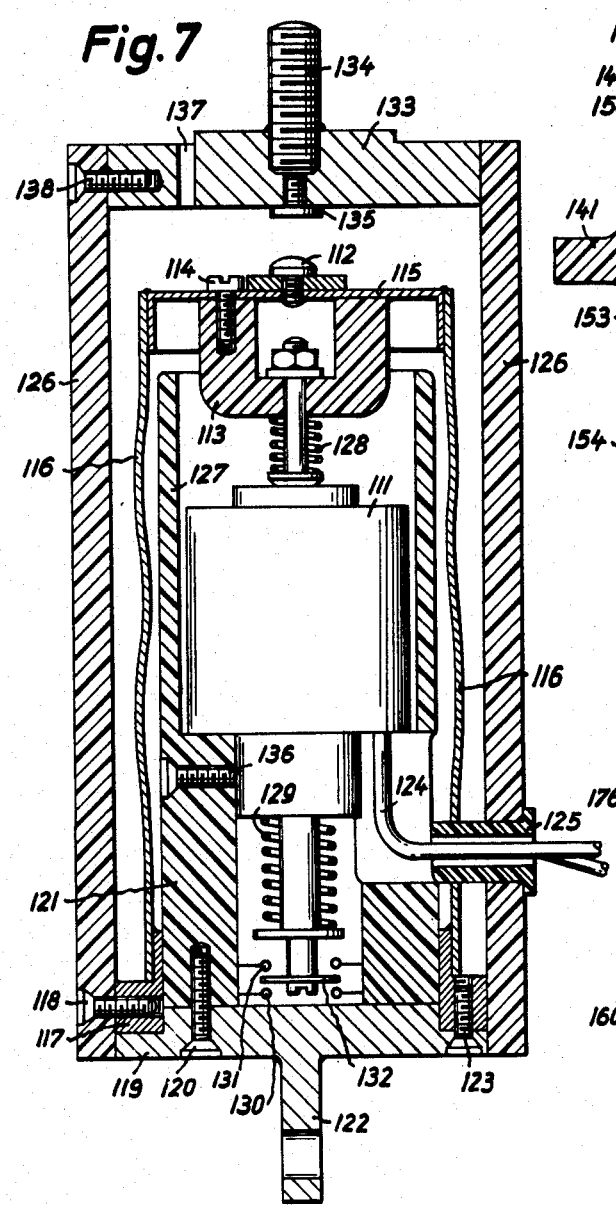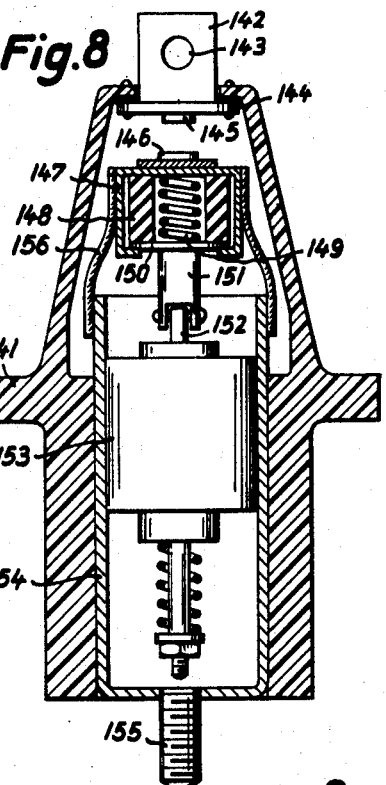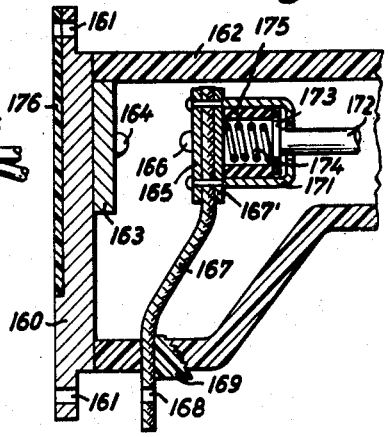

United States Patent Office 3,151,225
Patented Sept. 29, 1964

3,151,225
SHIELDING MEANS FOR AN ELECTROMAGNETIC ELECTRICAL CONTACTOR
Gerhard W. Seulen, Hammesbergerstrasse 31, Remscheid-Hasten, Germany
Filed Mar. 7, 1960, Ser. No. 13,296
8 Claims. (Cl. 200—87)

This invention pertains to the art of electrical contactors and more particularly to a contactor for handling relatively high electrical currents of either low or high frequencies.

The contactors for electrical equipment carrying comparatively high currents are normally installed at specially provided points, without taking into consideration the question of the amount of bus-bars or leads involved. Thus the individual contactors are fitted in standard groups at such points, either inside or directly onto a mechanically strong framework. This is necessary, in order to overcome the dynamic forces which are induced when the switch-gear is operated. The weight of the components (consisting essentially of the heavy contacts and operating mechanism) which are brought into operation by the switching process exerts a heavy strain on the switch-gear suspension; so that it becomes necessary for the latter to be firmly secured by some mechanical means. The leads for electrical installations of this type—which, generally speaking, are employed in industry and in certain other trades—take the form of bus-bars or other rigid conductors, such as copper rods or tubes, fitted either with insulated brackets or covered with insulating material. As a result of housing the contactors without regard to electrical considerations, not only the conductors, but also the auxiliary wiring for the components activating the contactors have to be brought to the point where the switch-gear happens to be located, purely as a matter of mechanical expediency. Lay-outs of this nature give rise to serious disadvantages in the case of installations which are employed within confined spaces. The present invention relates to an improved switching equipment for such high current appliances as transformers, condensers, choke coils, D.C. electroplating plants, exciter windings, heater elements, welding heads, etc. which overcome all of the above difficulties.

In addition to the disadvantages arising out of the bulk of the switching equipment in cases where the wiring is laid out as described above, there are also disadvantages from the electrical point of view. Especially where apparatus using frequencies in excess of the conventional 60 cycles per second is concerned, such an arrangement gives rise to unnecessarily complicated and devious wiring, as well as to unnecessary increases in the inductance, and to difficulties owing to superimposed fields. Moreover the resistance, depending upon the frequency of these lengthy conductors, causes undesirable reductions in the voltage of the various appliances using comparatively powerful currents. Examples of appliances of this description are: induction heating and furnace installations, and resistance heating and welding plants, which are frequently operated at fairly high frequencies, and where, owing to the number of different jobs to be heated the operating conditions vary, and the switch-gear is subjected to very heavy stresses. Appliances forming part of installations of this type require appreciable variations in the reactive current. Consequently, the accompanying sets of condensers, transformers, choke-coils, inductors, etc. must be individually adjusted to a uniform degree, in order to adapt the working conditions to the fluctuations in the consumer's nominal power factor.

A further problem with switches of this general type is the magnetic field around the power leads which can induce damaging eddy currents or voltages in the power means for operating the switch.

The present invention relates to an improved switching equipment which overcomes all of the above difficulties and others and provides a switch which does not impose undue physical strains on its supports and may be located in the apparatus so that the leads are as short as possible.

The principal object of the present invention is to provide switch-gears for low or medium frequency powered electrical components, such as condensers, transformers, choke-coils, bus-bars, and other items as described above, which are employed in conjunction with high current circuits which may be situated in close proximity to the terminals of the component (preferably along its axis) and may be firmly fixed either to the housing of the component or to the terminals thereof.

Another object of the invention is to provide a new and improved contactor which is so designed that the special switching equipment can be installed at any desired point in the most convenient circuit and does not require any special mechanical support, but is retained in position solely by the electrical conductors, e.g. bus-bars.

Another object is to provide a contactor in which the switch-gear components are only moved in the direction in which the current at the contacts is passing; so that no other powered components are needed for the switching process.

Another object of the invention is the provision of a contactor which may be placed directly on or above the terminal or lead-in for the appliance to be operated, to which it can be rigidly secured.

Still another object is to provide a contact so shaped that it can also, if required, be built into the lead-in for even a single condenser, transformer or choke-coil which can be used with the appropriate switch or switches securely attached to it.

Another object is to provide a contactor which is independent of the point where it is to be installed, and hence can be built in anywhere along the most suitable circuit or connection, thus avoiding, for instance, the necessity for the site for the switch-gear to coincide with that of specific components—or even that of the appliance (such as a condenser) to be operated. It is often found to be an advantage if the contactor is attached to a bus-bar or other solid connection or lead.

It is preferable for the contactor to be of the single-pole type; but it can readily be manufactured with more than one pole. If necessary, appropriate open or closed circuit contacts for auxiliary equipment (e.g. pilot-lamps or buzzers, locking devices, etc.) can be provided.

The invention consists of a contactor for low or medium frequency appliances, either A.C. or D.C., using high current circuits, and is so designed that the contactors are placed in the immediate proximity of the appliances or components to be operated, and to which they are firmly secured.

The principal object of the present invention is to provide a new and improved electrical contactor for low or medium frequency powered components such as condensers, transformers, choke-coils or bus-bars which may be mounted directly on such a component so that the power lead length to the contactor may be held to a minimum.

In accordance with the present invention, an electrical contactor is provided having a terminal rigidly fixed to the housing or frame of the contactor and having provision for rigidly mounting the entire contactor on a suitable power lead such as a bus-bar or terminal of a component to be switched, such as a condenser, transformer, choke-coil or the like.

Further in accordance with the invention, an electrical contactor is provided including a fixed contact and a movable contact wherein the fixed contact is rigidly fastened to an electrical component and has a contacting surface, the movable contact being movable in a direction perpendicular to such contacting surface and all of the portions of the contactor being movable in the same direction.

Still further in accordance with the invention, an electrical contactor is provided including a fixed contact and a movable contact, the power being supplied to the movable contact through an electrically conductive member so arranged as to shield the operating means for such movable contact from the magnetic field of the electrical power flowing through the contacts.

Still further in accordance with the invention, a contactor is provided for fastening to rigid electrical components such as a bus-bar, including a fixed contact rigidly fastened to the bus-bar and a movable contact movable into and out of contact with the fixed contacts, such movable contacts extending in close spaced relationship to the bus-bar whereby to limit the extent of the magnetic field therearound and the operating coil for the movable contact being positioned on the side of the movable contact remote from the bus-bar so as to be shielded from the magnetic fields of the currents flowing through the movable contacts.

The invention may take physical form in certain parts and arrangements of parts, preferred embodiments of which will be described in detail in this specification and illustrated in the accompanying drawings which are a part hereof and wherein:

FIGURE 4 is a side elevational view of the invention where the contactor is fitted to a bus-bar;

FIGURE 5 illustrates a further design carried out in accordance with the invention. In this case the contactor is attached laterally to the bus-bar;

FIGURE 6 is a cross sectional view of a contactor embodying the invention;

FIGURE 7 shows a modified version of the contactor of FIGURE 6, also in section;

FIGURE 8 shows, in section, a similar contactor, as built into the lead-in of a transformer or other appliance;

FIGURE 9 represents, in diagrammatic form, a still further embodiment of the invention;

Figure 1:
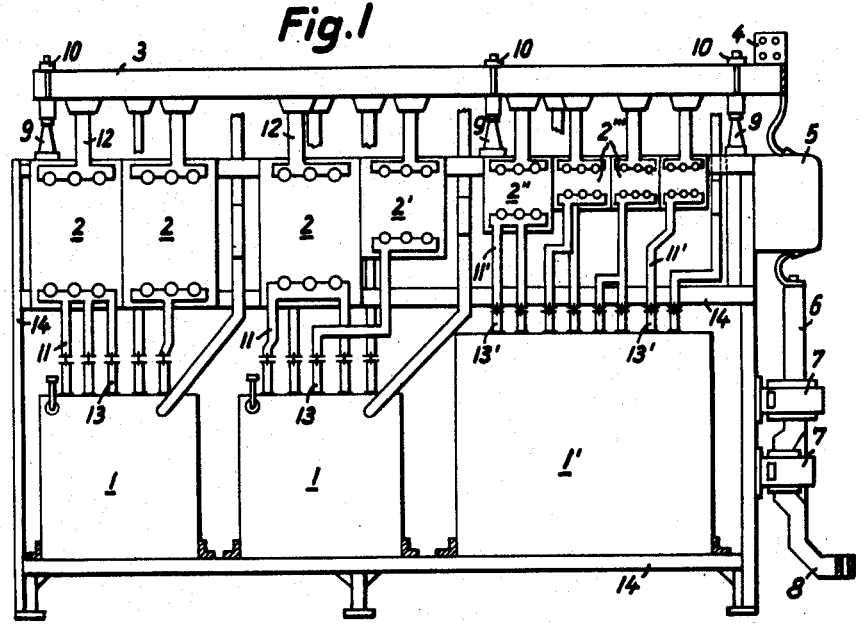
FIGURE 1 is a front elevational view of a conventional layout for condensers, contactors and switch gear.

Referring now to the drawings wherein the showings are for the purposes of illustrating preferred embodiments of the invention only and not for the purposes of limiting same, FIGURE 1 illustrates a standard design of condenser benches equipped with the usual contactors and switch gear. Condensers 1 and 1' are connected to the bus-bar 3 by the contactors 2, 2', 2" and 2'". Copper bars 11 and 11' pass from the leads 13 and 13' on the condensers 1 and 1' to the terminals of conventional contactors 2, 2', 2" and 2'". These contactors are mounted, in the normal manner, on an angle-iron frame 14. From the output terminals of the contactors 2 to 2'" copper rods 12 lead to the bus-bar 3, which is retained by insulators 9 and brackets 10. The switch 5 and the transformers 7 are also fitted onto the side of the iron frame 14, and have separate bus-bars 6. At 4 and 8 of the bus-bars 3 and 6 are the consumer and power terminals. The illustration shows a typical lay-out for the type of switching equipment in use at the present time. It also clearly indicates the unavoidably complicated and devious wiring which is necessary, owing to the build-up of the switching equipment on the frame 14.

Figures 2, 2A:
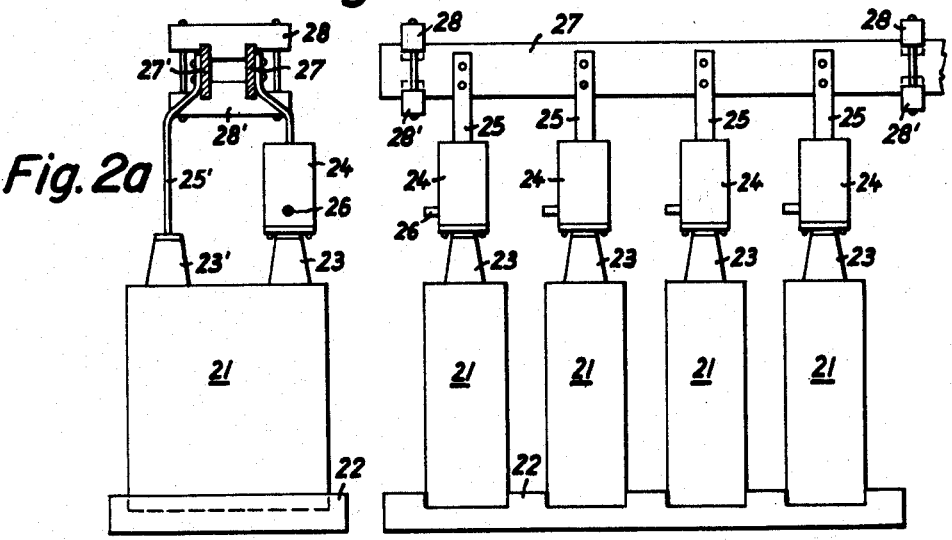
FIGURE 2 is a front elevational view of a layout employing contactors constructed in accordance with the invention.
FIGURE 2a is a side elevational view of FIGURE 2.

FIGURES 2 and 2a show front and side elevations respectively of a similar lay-out, but designed in accordance with the invention, with condensers as the appliances to be connected or disconnected to the circuit. The condensers 21 are fitted in appropriate holders 22. The leads 23 of the condensers 21 are fitted with single-pole contactors 24, which are designed in accordance with the invention, and in accordance with the invention, the terminals or bases of these contactors are engaged or fastened directly onto the conducting face of the lead-in 23. The outgoing bars or leads 25 of the contactors 24 are screwed directly onto the bus-bar 27. Since these connections are short and rigid, bus-bar 27 can be supported by the contactors 24 and/or the leads 23 without requiring any additional support. In the case of large installations, bus-bar 27 can also be supported by the bus-bar brackets 28 and 28', which are fastened to walls, ceilings, ironwork, etc. The latter will therefore also carry the opposite phase bars 27', which are connected by the bars 25' directly to the condenser leads 23'.

The feed for the operating components of the contactors 24 are brought to the insulated terminal 26.

Comparison with FIGURE 1 vividly shows the advantages of contactors designed in accordance with the invention. The amount of space required is considerably smaller, and the length of wiring material needed is also greatly reduced. Bulky lay-outs, involving the use of iron frames or panels are completely eliminated. Complicated and devious leads, resulting in reductions and leakages in voltage, are, for all practical purposes, entirely avoided.

Figure 3:
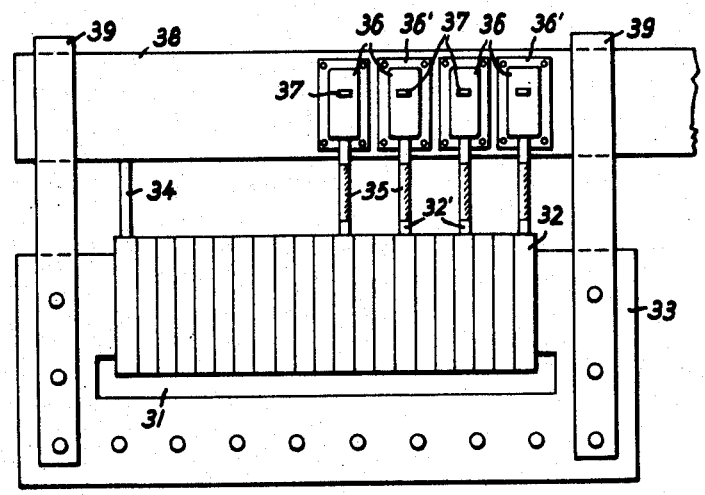
FIGURE 3 is a side elevational view of contactors embodying the present invention employed in conjunction with a tapped transformer.
Figure 12:
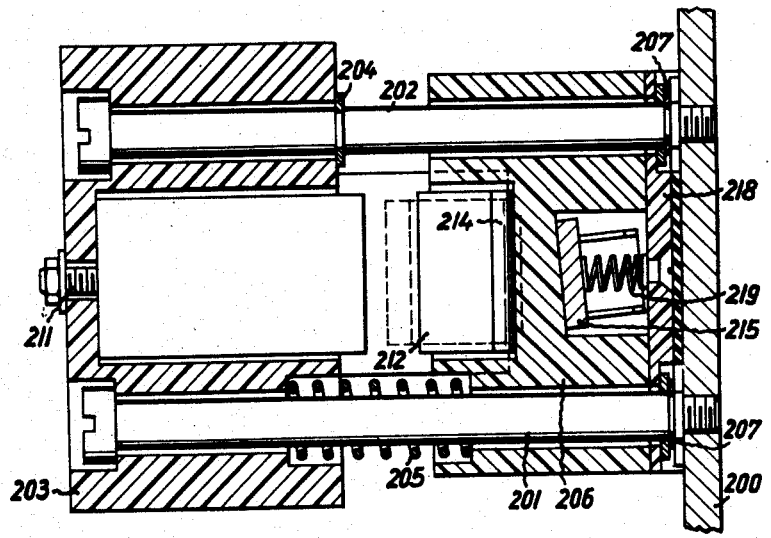
FIGURES 11 and 12 show still further embodiments of the invention which can be used with any of the appliances or equipment, as previously described.

FIGURE 3 shows an example of a contactor constructed in accordance with the invention and used in conjunction with a tapped single-phase low or medium frequency transformer. The transformer 31 consists of the winding 32, the core 33 and the secondary winding, which is not shown. The taps 32' on the winding 32 are coupled by means of either flexible or rigid connections 35 to the terminals of the contactors 36. The contactors in accordance with the invention are fitted directly onto a bus-bar 38 and electrical contact is made at the same time. The copper plates 36' are used for this purpose, and may be bolted, riveted, soldered or welded onto the bus-bar 38 or other lead.

The bus-bar brackets 39, which are made of insulating material, secure the bus-bar 38 and the second bar, lying behind it, to the transformer 31. One terminal 34 of the transformer 32 leads to the second bar, which is not illustrated.

The leads for actuating or controlling the contactors 36 are insulated and introduced at 37.

FIGURE 4 shows one method of attaching the contactor 41 to a bus-bar system 45, 46. The two bus-bars 45 and 46 are insulated from each other by the insulating strip 47. Bus-bar 45 is cut to form a lug 45' which is bent at an angle and receives contactor 41. Bus-bars 45, 46 and insulating strip 47 are retained by brackets 48 and 48', which are connected to each other at 49 and 49'.

The flange 42 of the contactor 41 is bolted onto the lug 45'. It can also be clamped in position by means of bayonet-type attachments. In that case, the connecting flange 42 may consist entirely of metal, but it may also be made from insulating material and fitted with a contact plate at one point on the upper surface. The outgoing lead to the appliance to be operated is run from the contactor 41 by means of the terminal 43, consisting of a bar, bolt, hollow bolt or similar. The connection to the appliance is by means of a copper wire 43' or, alternatively, by means of firmly secured bars, cables, tubes, etc. The leads, controlling the contactor are introduced at 44.

FIGURE 5 shows an alternative method of securing the invention to a bus-bar. In this case the flange 104 of the contactor 105 is fitted to the angular portion 103' of the copper bar 103. This bar 103 is connected to the bus-bar 101 by means of nuts and bolts 108. The casing, made from insulating material, for the contactor 105 has a trumpet-shaped protuberance 106, through which passes the copper wire 107, leading to the appliance to be operated. Similarly, contactor 105 can also be sited either over or underneath bus-bar 101. In that case, the pole of the contactor near to the point of attachment can be secured by means of brackets, plates, etc., of insulating material, which are secured by mechanical means on, over or under the appliance or component to be operated, so that at the same time electrical contact is established. Alternatively, the contactor can also be bolted onto the appliance of component.

Hence, the contactor can be mechanically secured either over or underneath the bus-bar or appliances to be operated or to suitable components in the same or similar manner as shown in FIGURES 4 and 5, where they are used in conjunction with bus-bars. In particular, the leads for the appliances to be operated can be designed in such a way as to enable the contactor to be placed on or attached to them in the manner described above. In many instances, especially where there are a considerable number of tappings on the same appliance, a device similar to a bus-bar can also be employed.

FIGURE 6 illustrates one embodiment of a contactor constructed in accordance with the invention. It is characterized by, preferably, a cylindrical casing 73, made from insulating material, and containing a compartment for the switching components. One end 52 of the casing carries the terminal or lead-in 51 to the appliance to be operated, while the other terminal or outgoing lead 70 is attached at the opposite end 69. The components for activating the movable contact 57 are in accordance with the invention, accommodated in a magnetically free compartment, formed by the hollow shape of the metal lead-in and/or lead-out. In the case illustrated, this field-free compartment is formed (inside the lead-in) by the metal bellows 54 and the metal tube 55. The D.C. magnet 61 and its plunger 60 are fitted into this chamber. The plunger supports the insulating plate 59, to which is attached the contact-holder 56 for contact 57, e.g. by screws, 58. The contact holder, 56, being of metal, is in electrical contact with tube 55. The lead-in to the magnetic system is effected by the leads 63 through an insulated tube 64. The magnetic system 61 is carried, by means of three screws 65 and distance pieces 66, by the plate 67 and at the same time is insulated from the live components. The metal bellows 54 is connected electrically with the plate 52 by means of the ring 53. The fixed contact 68 is secured to the top plate 69 by the terminal bolt 70 and the nut 71, the whole assembly being rigid. The hole 72 is for ventilation purposes. It can also be used as a filler-hole (which can then be closed) for filling the field-free cavity with oil for extinguishing any sparks or arcing that may be induced when the switch is open. It is to be noted that the terminals 51 and 70 are rigidly fastened to the housing and this can serve as the mounting means for the entire device to an electrically conductive bus-bar. In the example illustrated, the contactor functions as an "operating device," with the plunger 60 exerting pressure.

FIGURE 7 shows an alternative embodiment of a contactor constructed in accordance with the invention. Here, the hollow vessel consists of a metal tube 116, which can be made either in the form of a closed tube or with two or more strips, leaves or strands arranged round the circumference.

The magnetic system 111 operates the movable contact 112, which is mounted on the contact plate 115. A brush 113, made from insulating material, is secured to the contact plate 115 by three screws 114. Plate 115 is in electrical contact with a corrugated metal tube 116. The lower end of tube 116 is connected to the sleeve 117 which in turn is fastened to the base plate 119 by screws 123. Screws 118 retain the base-plate inside the insulated casing 126, while screws 120 secure the insulator 121 which takes the magnet 111.

The magnet is fastened inside this insulator by means of screws 136. The return spring for the magnetic system is shown at 129. 130, 131 and 132 show the auxiliary contacts, which can be added if necessary. The leads 124 to the magnetic system 111 pass through the insulating bushing 125. When contact is established by the two contacts 112 and 135, the contact spring 128 is under compression, thus ensuring that the operation of opening the contacts occurs rapidly.

The top plate 133 is secured to the insulated casing 126 by screws 138. The terminal bolt 134 is used to connect the lead in the same way as the bar 122. The ventilation hole 137 can also be used for filling the contactor with oil or other non-conducting fluids.

The special advantage of the contactors shown in FIGURES 6 and 7 lies in the fact that in the invention the movable contact is displaced along the axis of the switch gear casing. This avoids the setting up of any forces outside this axis.

In the examples illustrated, the magnetic system is fed by leads which are insulated against the full closed circuit voltage of the appliance. The magnetic system can also be fed by using insulated transformers in the case of A.C. magnets or insulated rectifiers in the case of D.C. magnets.

FIGURE 8 illustrates another application of the invention, whereby the contactor is built into a lead-in. It can be built into a lead-in in this manner to operate not only condensers and transformers, but other appliances.

The fixed contact 145 is fitted at the upper end of the lead-in 141, which is manufactured from either ceramic or plastic material. This contact carries the terminal bar 142, which has a hole 143 drilled through it to enable it to be fastened in position. It is attached to the lead-in by means of clamps or screws, as illustrated at 144. The movable counter-contact 146 is carried by a copper cup 147, containing the contact spring 149 and a foam rubber pad 148, which acts as a guide for the contact spring and governs the tension.

The disc 150, together with the sleeve 151, is of plastic. To enable it to be fitted into the cup 147, it is provided with a radial slot. The sleeve 151 is attached to the magnet plunger 152 by screws, rivets, cotters or clips. The magnetic system 153 is pressed into the metal tube 154, at one end of which is the terminal bolt 155. On the metal cup 147 are flexible leads 156, which conduct the current to the tube 154. Here, too, the compartment housing the switching system is virtually magnetically free.

The design of the metal cup 147, the disc 150 and the spring 149 is particularly suitable, since only light-weight parts have to be moved, with the result that the switching operations are carried out at the maximum speed.

FIGURES 6–8 show the contactor powered by D.C. systems, but A.C. magnets may also be used, in which case the cylindrical shape of the field-free compartment will have to be modified—at any rate in the region where the magnetic system is accommodated.

In a further extension of the contactor relating to the invention, the magnet, whether D.C. or A.C., is designed so that the magnet guides or strips, whether live or insulated, can be placed either inside or outside the two contacts completing the circuit, either or both of which can be moved along their axis, by means of a spring. They then form a rigid component of the contacts, but have no current passing through them. The D.C. or A.C. exciter coil must be insulated from the closed circuit voltage by embedding it in plastic or other suitable insulating material. In this instance, too, the solenoid coil can be supplied from either an insulated transformer or suitable rectifier.

As shown in FIGURE 8, the body of the magnet 153 is in electrical contact with the surrounding tube 154. However, one half of the solenoid could be attached to the movable contact and the other half to the second contact, so that when the magnet-coil is switched on, the contacts are pressed against each other, while the two halves of the solenoid also move together until they are in contact. By employing appropriate contact springs the necessary pressure both for making the contact and for returning the contacts to their original position can be produced. In accordance with the usual practice, return springs are used to open the two halves of the magnetic system.

FIGURE 9 shows yet another form of the contactor covered by the invention. In this case the fixed contact is placed directly onto the front securing plate. The lead to the movable second contact consists of metal leaves or strips. It is so arranged that, in view of their close proximity, the currents in the strips and face-plate flowing in opposite directions create a virtually field-free space in the insulated casing housing the operating mechanism, i.e., the A.C. or D.C. magnets. A plate 160 is used to screw the contactor onto either the particular appliance to be operated or onto a bus-bar. The holes 161 are provided for this purpose. It can also be attached by making use of screws with a bayonet-type projection, in which case it must be given a part turn. As shown in diagrammatic form in FIGURE 9, the insulated casing 162 is attached to the securing plate 160 by means of screws, hooks, pins, etc. In conjunction with the flexible lead 167 and its bed 167' the contact plate 165 for the movable contact 166 forms a single conducting unit. The cup-shaped component 171 is secured to the plate 165 by bolts or pins, after the disc 173, spring 174 and foam rubber 175 have been fitted. The magnetic system (either D.C. or A.C.) is connected by means of the bolt 172, which can also be in the form of a sleeve. The conductor lead or strip 167 is led out through the casing 162 and held in position at the point of emergence by, say, a corrugated plastic wedge 169. The connection to the appliance to be operated or to the relevant component of the switching equipment is shown at 168.

In order to ensure that the flow of current is entirely unaffected by the type of fastening employed to secure the contactor, and hence to reduce leakage, part of the surface of the connecting plate 160 may be covered with a layer of insulating material 176. The current in plate 160 and strip 167 will then pass, within strictly defined channels, in opposite directions.

Figure 10:
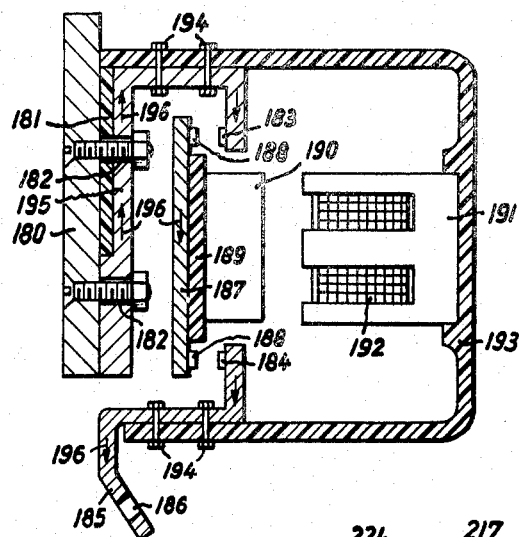
FIGURE 10 illustrates a still further embodiment of the invention in side cross section.
Figure 11:
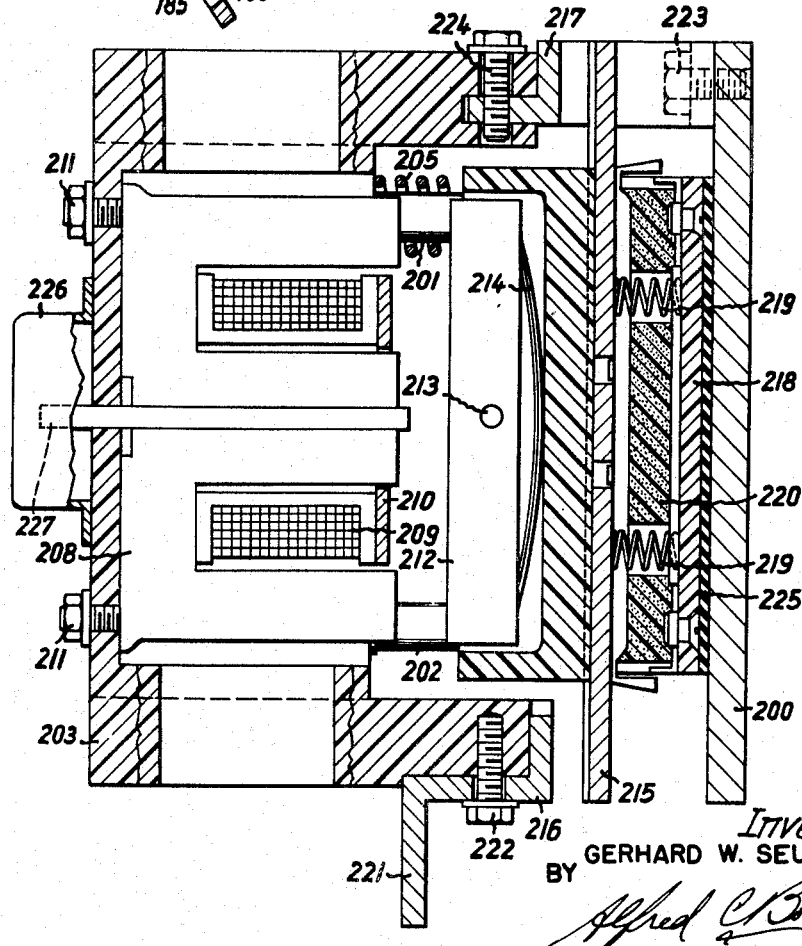

FIGURE 10 shows a modified form of a contactor designed in accordance with the invention. It is fitted with two fixed and one movable (bridge) contacts. These are placed at points on the face-plate, so that when the device is switched on the currents flowing in opposite directions pass in close proximity to one another, with the result that the operating components, which are contained in the insulated housing, and which should preferably be in the form of a D.C. magnet (although an A.C. magnet may be used as an alternative) are, for all practical purposes, magnetically free.

A terminal bar 180 of an appliance to be operated, to which the contactor, together with the terminal plate 195, is attached (e.g., by screws, which are passed through the holes 182).

Behind the terminal plate 195 is a plate of insulating material 181, so that when the contactor is closed the current will flow in the direction of the arrows 196. As will be seen from these arrows, currents flowing in opposite directions pass in close proximity to each other. The contacts 183 and 184 are attached to the terminal plate 195 and the piece 185 respectively. The connection to the installation passes through the latter at 186. The two contacts 183 and 184 are closed by means of the bridge contacts 188, which are fixed to the contact bar 187. This bar is connected to the armature 190 of an A.C. magnet at 191 and 192. The connection can be live or, alternatively, a plate of insulating material 189 can be laid in between. The magnetic system is contained in the plastic casing 193.

For the purposes of simplification all leads, contact springs, auxiliary contacts, etc., have been omitted from FIGURE 10. These components, which are of conventional design, can be fitted in the usual manner.

The foregoing design also enables the contactor to be incorporated in a bus-bar system, the procedure for which has already been described. The design shown in FIGURE 10 has proved particularly successful in actual practice. A contactor of this type is shown in greater detail in Illustrations 11 and 12. The contactor is attached to the conductor 200, which, in this case, takes the form of a metal bus-bar. Two bolts 201 and a further two bolts 202 secure the upper portion (of insulating material) of the contactor to the metal conductor 200. The fixed top 203 is held in position by a washer 204 which is fitted on each of the bolts 202. On each of the other two bolts is a return spring 205, which forces the movable base (manufactured from insulating material) into its original position. The final position of the movable base 206 is determined by the washers 207 which are placed round the bolts.

The inside of the fixed upper portion 203 holds the core 208 of the magnet, the magnet coil 209 and the coil holder 210. Magnet coil 209 is so designed that the retaining strip 210 presses its contacts against the corresponding contacts (not illustrated), which are either rigidly or elastically attached to the base of the casing 203. The movable part 206 (of insulating material) contains the yoke 212, which can be moved about a bolt 213. This yoke 212 is kept to one side inside the casing 206 by a leaf-spring 214. To the rear of this casing is the metal contact bridge 215, which conducts the current to the two contacts 216 and 217 when the yoke 212 is drawn forward. It is better for all points of contact to be covered with a layer of good conducting material, such as silver. The contact bridge 215 is accommodated in a cut-out portion of the movable casing 206. It is retained against terminal plate 218 (which is screwed tight) by means of one or more springs. The terminal plate should preferably consist of some insulating material. Foam rubber 220 can be inserted for guiding the springs 219. In many cases it will be of assistance if the contact bridge 215 is fitted obliquely, in order to ensure a definite degree of contact between the bridge and the two contacts 216 and 217. Contact 216 is fitted with a terminal lug 221, to which the appliance to be operated is connected. Contact 216 is connected to the insulated cover 203 either by a screw 222 or some other type of fastening, such as clamps, pins, etc. Contact 217 is connected to the bus-bar 200 by the screw shown at 223. At the same time, this contact is also attached to the casing 203 by a screw 224 or similar type of fastening. The springs 219 are insulated by the inlay 225 on the bus-bar 200. The magnet coil terminal is at the back of the fixed cover 203. Similarly, open and closed circuit contacts can also be placed inside the box 226 attached to the back of the casing, to serve as auxiliary contacts. These are activated by a plunger 227, made from non-magnetic metal or insulated material, which extends through the core 208 and is moved by the yoke 212.

When the contactor is operated as shown in Illustrations 11 and 12 the current to be applied is passed directly from the conductor 200 through the contact 217 and contact bridge 215 to contact 216. This amounts to what is virtually a 2-pole winding, and restricts the magnetic field which is induced when the current is applied to a minimum. This eliminates any heating by induction of metallic parts of the contactor, while losses caused by induction are reduced to a minimum. Hence, this contactor is particularly suitable for applying currents in excess of mains frequencies. It is particularly useful for use in conjunction with induction heating installations working on frequencies of 150–100,000 c.p.s. and for melting installations operating on similar frequencies. However, it is also ideally suitable for welding equipment, high-speed tools using comparatively high frequencies—and, in fact, for all other appliances using more than mains frequencies.

The contactors illustrated in the figures referred to can also be constructed in modified form. In particular, the types described with reference to any one figure can also be employed with switching equipment specified in other figures. All these devices can be powered by either D.C. or A.C. However, it is also possible to operate them by other means, e.g., mechanically, hydraulically or pneumatically.

For use with currents up to 500 amps the devices are air-cooled, but where higher amperages are required, especially those of up to 10,000 amps, either one or both contacts and contact brackets can be water-cooled. A further modification makes it possible for only the fixed conducting parts of these highpower current contactors to be water-cooled, which at the same time absorbs heat losses from the moving parts.

Thus it will be seen that embodiments of the invention have been described which accomplishes all of the objectives heretofore set forth and others, and provide an electrical contactor which may be mounted directly on an electrical component to which electrical power must be supplied or taken away, which is simple in construction and economical to manufacture.

The invention has been described with reference to preferred embodiments. Obviously, modifications and alterations differing in appearance from these preferred embodiments will occur to others upon a reading and understanding of this specification, and it is my intention to include all such modifications and alterations insofar as they come within the scope of the appended claims.

Having thus described my invention, I claim:

1. In an electrical contactor adapted to be secured onto a rigid electrically conductive member to which electrical power is to be supplied or taken away, said contactor comprising in combination: an electrically insulating housing, a fixed contact rigidly mounted on said housing, a movable contact adapted to be moved into and out of electrical contact with said fixed contact, power means for moving said movable contact, a first terminal connected to said fixed contact by rigid electrically conductive means, a second terminal connected to said movable contact by electrically conductive means, at least one of said terminals being rigidly fastened to said housing and having means for rigidly fastening said housing to said electrically conductive member, said first and second terminals being at opposite ends of said housing and said power means being mounted in said housing intermediate said terminals, and the electrically conductive means connecting one of said contacts to its respective terminal extending past said power means, said electrically conductive means extending past said power means being arranged in non-current inducing relationship to said power means.

2. The combination of claim 1 wherein said electrically conductive means extending past said power means is in the form of a hollow cylinder surrounding said power means.

3. The combination as defined in claim 1 wherein the electrically conductive means extending past said power means includes a pair of electrically conductive members extending on diametrically opposite sides of said power means.

4. The combination as defined in claim 1 wherein said electrically conductive means which extends past said power means is connected to the movable contact and is extensible.

5. The combination as defined in claim 4 wherein said extensible electrically conductive means is in the form of a cylindrical bellows and said power means is positioned inside of said bellows.

6. An electrical contactor adapted to be supported on a rigid electrically conductive member to which electric power is to be supplied or taken away, a housing of electrically insulating material, supporting means mounting said housing in spaced relationship to said electrically conductive member, a fixed contact mounted on said housing on the side of said housing adjacent to said electrically conductive member, rigidly electrically conductive means connecting said contact to said electrically conductive member, a second fixed contact mounted on said housing and spaced from said first mentioned fixed contact, said contacts both having approximately the same spacing from said electrically conductive member, a movable contact between both of said fixed contacts and said electrically conductive member and of a length to simultaneously contact both of said fixed contacts, power means mounted on said housing and on the side of said movable contact remote from said electrically conductive member and means operatively associating said power means with said movable contact.

7. The improvement of claim 6 wherein said power means includes a pair of spaced electrically insulating members and said movable contact is positioned between said spaced members and resilient means bias said movable contact away from one of said members towards the other of said members.

8. An electrical contactor having a first terminal and a second terminal, an electrically insulating housing supporting said terminals, a source of current connected across said terminals, a fixed contact rigidly mounted on said first terminal, a movable contact adapted to be moved into and out of electrical contact with said fixed contact to establish and dis-establish the electrical connection between said first and said second terminal, said movable contact connected to said second terminal when said electrical connection is established, electrical power means for moving said movable contact, and current directing means connecting said first and said second terminals when said contacts are engaged, said current directing means shielding said power means from the flux of the current flowing in said current directing means.

References Cited in the file of this patent
UNITED STATES PATENTS

| | | |
|---|---|---|
| 1,928,722 | Gillen | Oct. 3, 1933 |
| 1,956,434 | Carlson | Apr. 24, 1934 |
| 2,645,689 | Matthews | July 14, 1953 |
| 2,890,308 | Debrey | June 9, 1959 |
| 2,897,311 | Schleicher | June 28, 1959 |
| 2,900,476 | Reece | Aug. 18, 1959 |
| 2,922,861 | White | Jan. 26, 1960 |
| 2,944,195 | Mobarry | July 5, 1960 |
| 2,951,133 | Davies et al. | Aug. 30, 1960 |
| 2,979,588 | Jennings | Apr. 11, 1961 |
| 3,014,108 | Cobine et al. | Dec. 19, 1961 |